US010583358B1

(12) United States Patent
Garcia

(10) Patent No.: US 10,583,358 B1
(45) Date of Patent: Mar. 10, 2020

(54) HEADSET FOR SIMULATING ACCELERATIONS

(71) Applicant: Pixar, Emeryville, CA (US)

(72) Inventor: Daniel Garcia, Emeryville, CA (US)

(73) Assignee: Pixar, Emeryville, CA (US)

( * ) Notice: Subject to any disclaimer, the term of this patent is extended or adjusted under 35 U.S.C. 154(b) by 38 days.

(21) Appl. No.: 15/413,096

(22) Filed: Jan. 23, 2017

(51) Int. Cl.
  *A63F 13/285* (2014.01)
  *G06F 3/01* (2006.01)
  *A63F 13/98* (2014.01)
  *A63F 13/245* (2014.01)
  *A63F 13/24* (2014.01)

(52) U.S. Cl.
  CPC .......... *A63F 13/285* (2014.09); *A63F 13/245* (2014.09); *A63F 13/98* (2014.09); *G06F 3/012* (2013.01); *A63F 13/24* (2014.09)

(58) Field of Classification Search
  CPC .......... A63F 13/00; A63F 13/02; A63F 13/08; A63F 13/211; A63F 13/24; A63F 13/245; A63F 13/285
  USPC .............................................. 463/1, 6, 46, 47
  See application file for complete search history.

(56) References Cited

U.S. PATENT DOCUMENTS

| 4,264,310 A * | 4/1981 | Ashworth ................. G09B 9/10 434/59 |
| 4,303,244 A * | 12/1981 | Uppvall ............. A63B 69/3608 273/DIG. 17 |
| 5,252,070 A * | 10/1993 | Jarrett ................... A61H 1/0218 434/30 |
| 6,672,972 B1 * | 1/2004 | Stone ................. A63B 69/3608 362/191 |
| 6,798,443 B1 * | 9/2004 | Maguire, Jr. ........... G06F 3/011 345/8 |
| 9,498,675 B2 * | 11/2016 | Walworth ............ A63B 23/025 |
| 9,962,555 B1 * | 5/2018 | Charles ................ A61B 5/0476 |
| 2012/0288831 A1 * | 11/2012 | Campion ............... G09B 9/048 434/62 |

(Continued)

FOREIGN PATENT DOCUMENTS

| CA | 2209252 A * | 7/1997 | ................ G09B 9/10 |
| WO | WO 2017153333 A1 * | 9/2017 | ............. G06F 1/163 |

OTHER PUBLICATIONS

Talon Simulations, LLC; A3™ Full Motion Simulators; retrieved Jan. 23, 2017, 16 pages <http://www.talonsimulations.com/pdf/Atomic-A3-Brochure.pdf>.

(Continued)

*Primary Examiner* — Chase E Leichliter
(74) *Attorney, Agent, or Firm* — Patterson + Sheridan, LLP

(57) ABSTRACT

Embodiments herein describe a headset that simulates accelerations that correspond to a visual presentation being viewed by the user. The headset includes a force system that applies a force on the head of the user to simulate an acceleration being viewed by the user. The force system may include an actuator that moves a weight to different locations on or around the headset. By moving the weight to different locations, the weight can apply a force that simulates acceleration. For example, the headset can move the weight to apply a force that lifts the head of the user up, which is similar to a force that would be applied if the user was physically accelerated forward. By moving the weight, the force system can simulate accelerations in any number of directions—e.g., front, back, left, right, etc.

19 Claims, 6 Drawing Sheets

(56) References Cited

U.S. PATENT DOCUMENTS

| | | | | |
|---|---|---|---|---|
| 2013/0204930 A1* | 8/2013 | Hobby | ............... | H04L 65/60 |
| | | | | 709/203 |
| 2014/0272915 A1* | 9/2014 | Higashino | ............ | B06B 1/16 |
| | | | | 434/365 |
| 2015/0044662 A1* | 2/2015 | Goto | .................. | G06F 3/011 |
| | | | | 434/365 |
| 2015/0068052 A1* | 3/2015 | Krueger | ............... | G01C 9/16 |
| | | | | 33/301 |
| 2015/0072836 A1* | 3/2015 | Versteegh | ...... | A63B 21/00065 |
| | | | | 482/10 |
| 2015/0273179 A1* | 10/2015 | Krueger | ............ | A61M 21/02 |
| | | | | 600/27 |
| 2016/0008206 A1* | 1/2016 | Devanaboyina | ...... | A47C 9/002 |
| | | | | 601/136 |
| 2016/0213973 A1* | 7/2016 | Walworth | ......... | A63B 23/025 |
| 2017/0036111 A1* | 2/2017 | Shigeta | ............ | G01C 21/165 |

OTHER PUBLICATIONS

Talon Simulations, LLC; A3™ Full Motion Simulators Technical Specifications; retrieved Jan. 23, 2017, 2 pages <http://www.talonsimulations.com/pdf/Atomic-A3-Technical-Specifications.pdf>.

SimXperience®; SimXperience Stage IV Motion Simulator Kit, retrieved Jan. 23, 2017, 2 pages <http://simxperience.com/en-us/products/motionsimulatorkits/stage4motionsimulatorkit.aspx>.

Kickstarter; "Immersit—Awesome Motion & Vibration Device Under Your Sofa", retrieved Jan. 23, 2017, 28 pages; <https://www.kickstarter.com/projects/423274566/immersit-awesome-motion-and-vibration-device-under>.

* cited by examiner

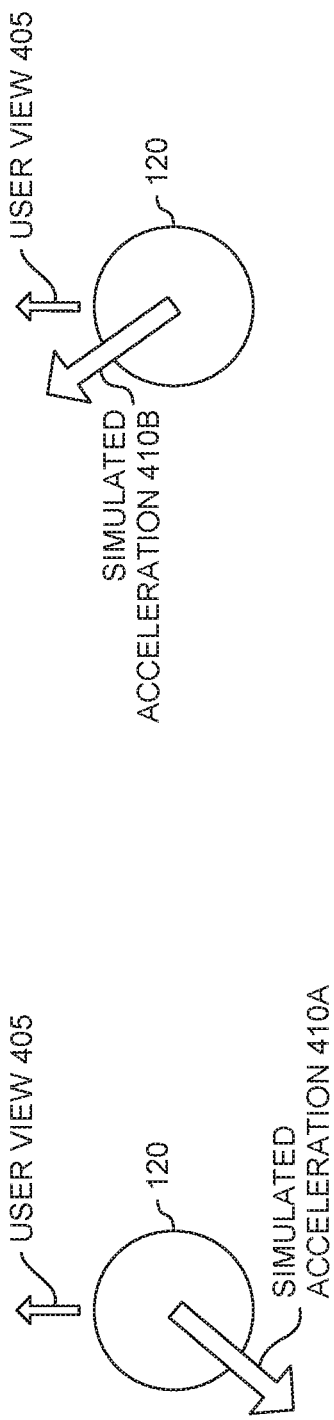

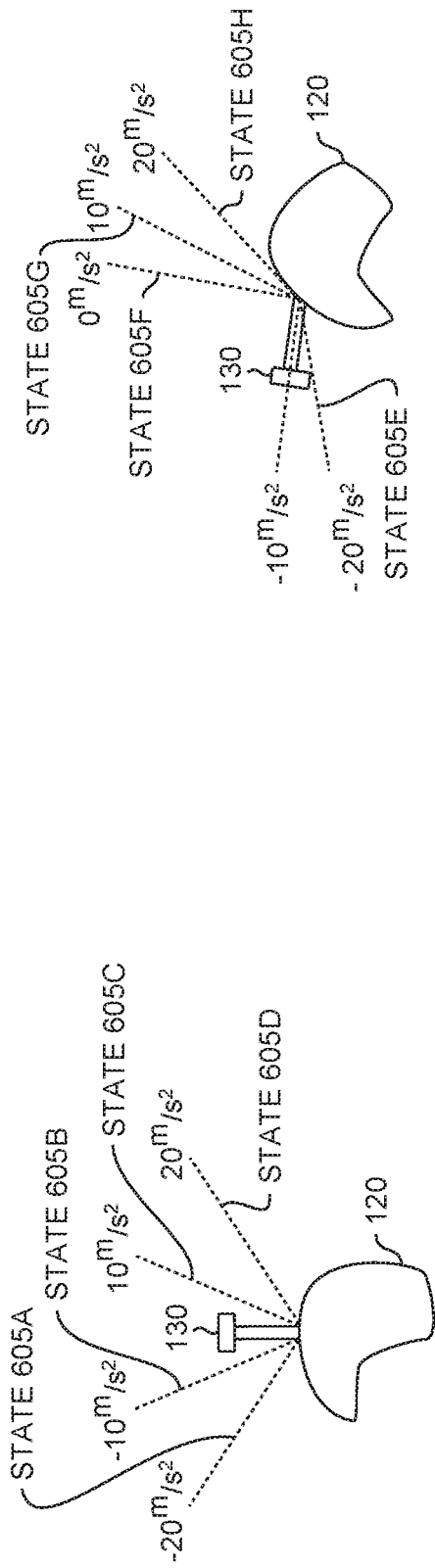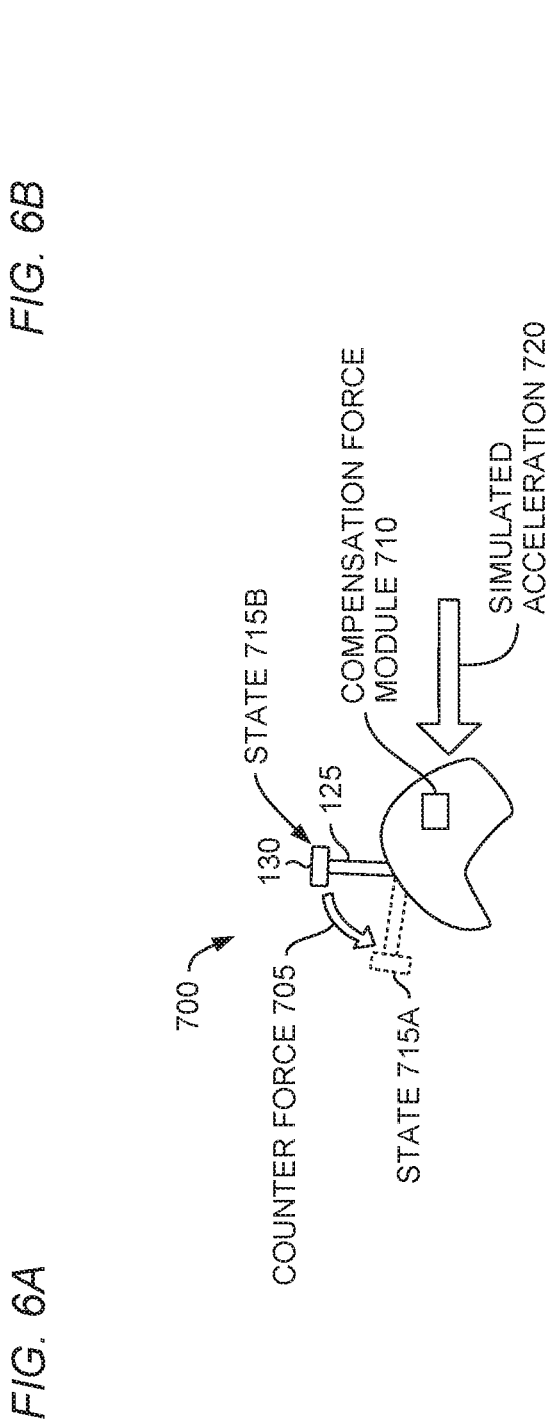
FIG. 6A
FIG. 6B
FIG. 7

HEADSET FOR SIMULATING ACCELERATIONS

BACKGROUND

Field of the Invention

The embodiments herein are generally directed to simulating accelerations using a headset.

Description of the Related Art

When playing a video games or watching a media presentation, the user experience can be enhanced by using actuators to apply forces on the user that simulate actions occurring in the video game or media presentation. For example, racing simulators can include a chair for the user which applies forces on the user that simulate accelerations that the user would experience if the user was actually driving the racing vehicle. For example, when the virtual vehicle accelerates, the chair may tilt back giving the user the impression she is accelerating. When turning, the chair may tilt to the side so that the user feels acceleration similar to what she would experience if she were actually in a vehicle that is turning. In another example, an amusement park may have a ride with chairs that can exert forces on the users that correspond to a car chase being displayed on a screen.

While these systems are effective, they are also expensive and bulky. For example, a racing simulator may require dedicated space in a room and cost tens of thousands of dollars. Further, these systems require the user to remain seated or stationary which prevents the user from freely moving around her environment. These drawbacks limit the appeal of these systems to the general public.

SUMMARY

One embodiment described herein is a headset that includes a head-mountable frame, a weight movably disposed on the frame, an actuator configured to control movement of the weight, and an acceleration simulator. The acceleration simulator is configured to receive an acceleration to be simulated by the headset, wherein the acceleration corresponds to a virtual acceleration caused by a virtual object in a displayed media presentation, determine a current state of the weight on the headset, determine a current orientation of the headset in space, determine a new state of the weight to simulate the acceleration on a user wearing the headset based on the current state and current orientation, and instruct the actuator to move the weight to achieve the new state.

Another embodiment described herein is a non-transitory computer readable storage medium that includes computer-readable program code for simulating an acceleration using a headset. The computer-readable program code performs an operation that includes receiving the acceleration to be simulated by the headset, wherein the acceleration corresponds to a virtual acceleration caused by a virtual object in a displayed media presentation, determining a current state of a weight on the headset, determining a current state of a weight on the headset, determining a new state of the weight to simulate the acceleration on a user wearing the headset based on the current state and current orientation and, instructing an actuator in the headset to move the weight to achieve the new state.

Another embodiment described herein is a system that includes a video game system configured to output a media presentation to a display and generate an acceleration corresponding to a virtual acceleration caused by a virtual object in the media presentation. The system includes a headset configured to receive the acceleration from the video game system, determine a new state of a weight on the headset to simulate the acceleration on a user wearing the headset, and instruct an actuator disposed on the headset to move the weight to achieve the new state.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 4A and 4B illustrate respective simulated accelerations, according to one embodiment described herein.

FIGS. 5A and 5B illustrate different states of a weight mounted on a headset, according to one embodiment described herein.

FIGS. 6A and 6B illustrate mapping a current state of the weight to different simulated accelerations, according to one embodiment described herein.

FIG. 7 illustrates a headset for compensating for a counter force when moving a weight mounted on the headset, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe a headset that simulates accelerations that correspond to a visual presentation being viewed by the user. In some embodiments, the headset is worn when a user plays a video game or watches a movie on an external screen. In another embodiment, the headset may include a built in display for displaying a virtual environment.

The headset includes a force system that applies a force on the head of the user to simulate a virtual acceleration being viewed by the user. That is, the headset generates a force that mimics the effect the virtual acceleration would have on the user if the user were in the video game or movie. The force system may include an actuator that moves a weight to different locations on or around the headset. For example, the weight may be attached to one end of a rod to form a pendulum while the other end is attached to the actuator. By moving the weight to different locations around the headset, the weight can apply a force to simulate acceleration. For example, if the user is playing a racing simulator where the virtual vehicle is accelerating in a forward direction, the force system may move the weight to the back of the headset (relative to the viewing direction of the user). The weight applies a force that lifts the head of the user up, which is a similar force that would be applied if the user was accelerated forward—i.e., if the user was actually in the virtual vehicle. By moving the weight, the force system can simulate accelerations in any number of directions—e.g., front, back, left, right, etc. Thus, the embodiments herein provide a headset which can simulate accelerations corresponding to a media presentation without expensive and bulky chairs.

Figure 1:
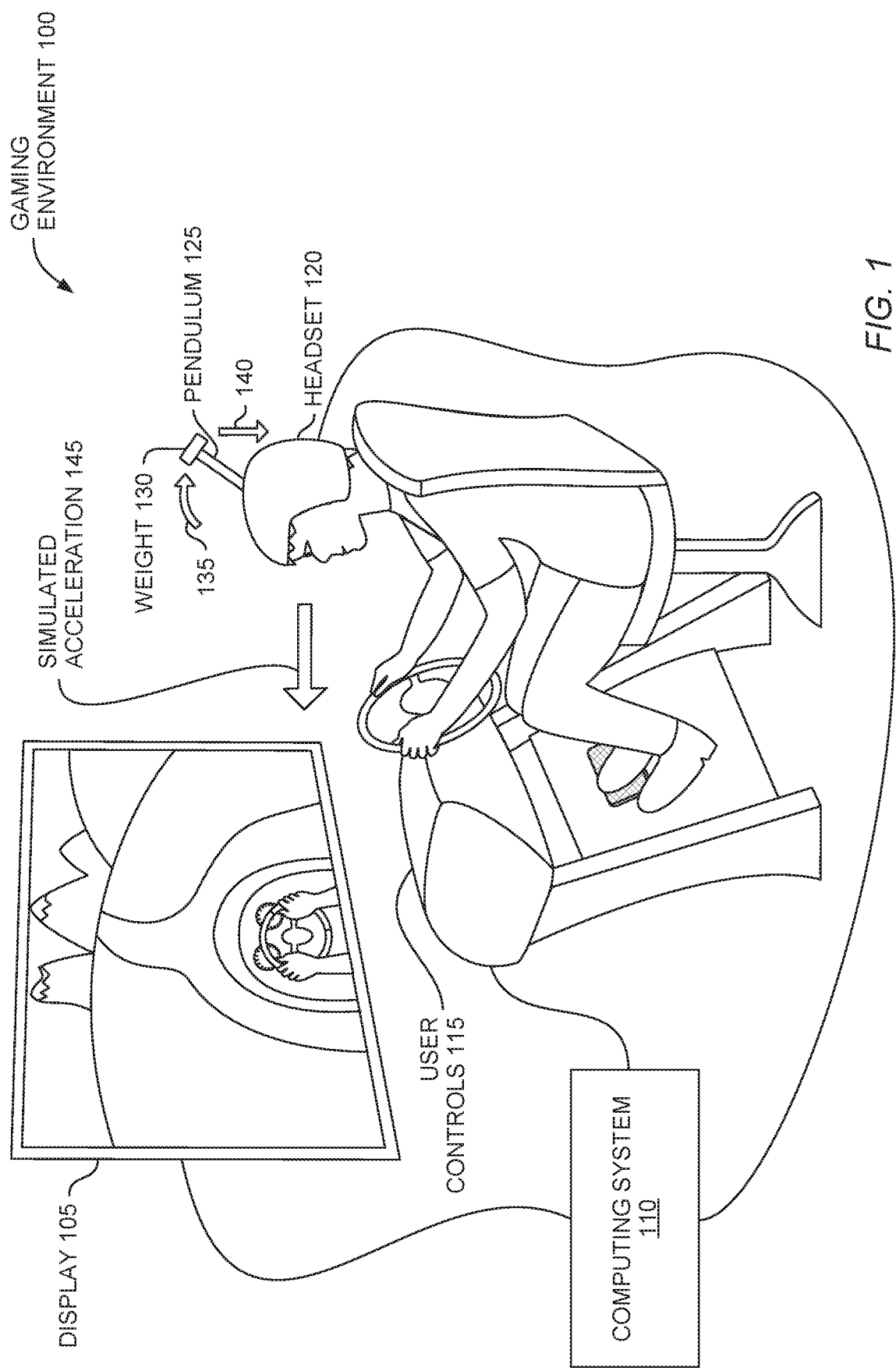
FIG. 1 illustrates a gaming environment for simulating accelerations on a user, according to one embodiment described herein.

FIG. 1 illustrates a gaming environment 100 for simulating accelerations on a user, according to one embodiment described herein. The environment 100 includes a display 105 that outputs a media presentation provided by a computing system 110. In this embodiment, the computing system 110 is a video game system that uses signals outputted by user controls 115 to control the media presentation (e.g., a racing game) outputted by the display 105. For example, the user controls 115 may include a steering wheel, gas pedal, brake pedal, shifter, and the like for controlling a virtual vehicle in the display 105.

The user can control the movement of the virtual vehicle in the virtual environment using the controls 115. For instance, the user can turn, accelerate, or deaccelerate the virtual vehicle. In FIG. 1, the user wears a headset 120 (e.g., a head-mountable frame such as a helmet, visor, headband, etc.) that includes a pendulum 125 with a weight 130 attached at one end, while the other end of the pendulum 125 is attached to an actuator for moving the weight 130 to different positions over the head of the user. As such, the weight is moveably disposed on the frame of the headset 120. Because the pendulum 125 and the weight 130 are fixably attached to the headset 120, moving the weight 130 causes a force on the headset 120. In this example, the headset moves the pendulum 125 to a location to simulate acceleration 145 which is in the same direction the user is facing. Arrow 135 illustrates that the pendulum 125 has moved backwards relative to the viewing direction of the user. Gravity causes a force on the weight 130 in a downward direction as shown by arrow 140. Because the base of the pendulum 125 is attached to the headset 120, the gravitational force on the weight 130 translates into a rotational force on the headset 120 which then pulls the head of the user up. In other words, the weight 130 causes a rotational force on the neck of the user that urges the head of the user to tilt up (and slightly backwards) which is similar to a force the user would feel if she were in a vehicle that was accelerating. This force results in the simulated acceleration 145. As described in more detail below, the forces generated by the weight 130 and the headset 120 can generate a force on the user that is similar to the same force the user would experience from an actual acceleration in the same direction as the simulated acceleration 145 (a forward acceleration in this example).

When the user presses down on a gas pedal in the user controls 115, the computing system 110 can, in parallel, output a video on the display 105 of the virtual vehicle accelerating and output a signal corresponding to the acceleration of the vehicle to the headset 120, which in turn, moves the pendulum as shown by the arrow 135. Thus, the user can both see the vehicle accelerating in the display 105 as well as feel a sensation simulating that acceleration on her head using the headset 120. As described in more detail below, the headset 120 may simulate accelerations in many different directions and can include different force systems than using an inverted pendulum as shown. Further, the headset 120 can be used independently of other accelerating simulation systems (e.g., a chair with actuators that moves the user) to simulate accelerations to the user. Because the vestibular system which provides the sense of balance and spatial orientation is confined to the head, moving the head is sufficient for simulating accelerations (rather than moving the whole body). However, in other embodiments, the headset 120 can be used in conjunction with systems that move the entire body of the user to provide a more immersive user experience.

Figure 2:
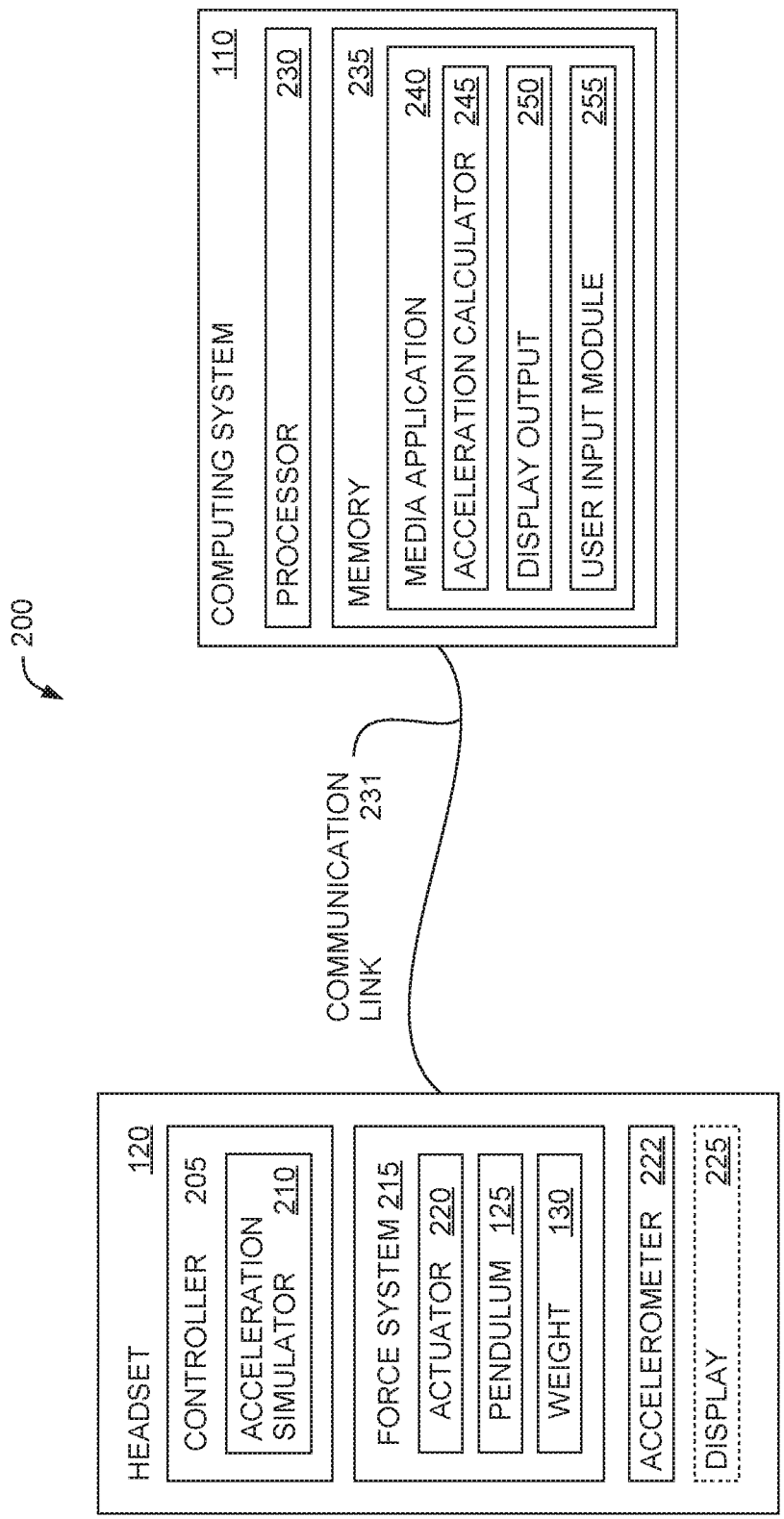
FIG. 2 is a block diagram of a system for simulating accelerations on a user wearing a headset, according to one embodiment described herein.

FIG. 2 is a block diagram of a system 200 for simulating accelerations on a user wearing the headset 120, according to one embodiment described herein. In the system 200, the headset 120 is coupled to the computing system 110 via a communication link 231 which may include one or more data communication wires. However, in another embodiment, the computing system 110 may transmit data wirelessly to the headset 120. Thus, the user is free to move around her environment while wearing the headset 120 (without any cables to trip the user) unlike traditional acceleration simulators which require the user to remain seated. Although the computing system 110 may be coupled to other devices (e.g., an external display, user controls, etc.), these devices are not shown in FIG. 2.

The headset 120 includes a controller 205, a force system 215, and accelerometers 222. In one embodiment, the controller 205 may include one or more processors or application specific integrated circuits (ASIC). In one embodiment, the controller 205 may be a microcontroller which includes an input for receiving data from the computing system 110. For example, the controller 205 may include a data port mounted on a printed circuit board coupled to the communication link 231. The controller 205 may be programmable to perform various functions and may execute firmware and/or software.

The controller 205 includes an acceleration simulator 210 which may include hardware, firmware, or software elements in the controller 205. As described in more detail below, the acceleration simulator 210 uses information received from the computing system to provide instructions to the force system 215. For example, the computing system 110 may transmit accelerations to the controller 205 which the acceleration simulator 210 converts into movements of the weight 130 in the force system 215 to simulate these accelerations on the user wearing the headset 120.

The force system 215 includes an actuator 220, the pendulum 125 and the weight 130. The actuator 220 receives instructions from the acceleration simulator 210 to move the pendulum 125 such that the weight 130 is at a desired location. As described above, gravity pulls the weight 130 down which has a corresponding force on the user wearing the headset 120 such as urging the head of the user up to simulate a forward acceleration or urging the head of the user down to simulate a backward acceleration (e.g., a deceleration). Although not shown, the headset 120 may include a fastening mechanism to hold the headset 120 to the head of the user such as a chinstrap, a strap around the user's forehead, and the like. Thus, a force applied by the weight 130 on the headset 120 is transferred to the head of the user.

In one embodiment, the pendulum 125 is coupled to the actuator 220 via a ball and socket connector. Using the ball and socket connector, the actuator 220 can move the pendulum 125 and the weight 130 to any position along a curved plane above the head of the user. In one embodiment, the ball and socket connector may be disposed in the middle of the headset, but this is not a requirement. For example, the pendulum 125 may couple to the connector at the back or side of the headset 120. In one embodiment, the location of the weight 130 over the headset 120 has the largest effect on the force felt by the user which simulates acceleration. For example, if the pendulum 125 is coupled to the back of the headset 120 rather than the middle, the acceleration simulator 210 can still simulate decelerations so long as the actuator 220 can move the weight 130 to a position in front of the user. In another embodiment, instead of a ball and socket, the headset 120 may include two actuators (e.g., X and Y actuators) coupled to the pendulum 125 which can move the pendulum 125 along two perpendicular directions so that the weight 130 can be moved to any position along a curved plane above the head of the user.

In another embodiment, the pendulum 125 is coupled to the actuator 220 via a lever which permits the weight 130 to move in an arc from a first point in front of the user to a second point behind the user or from a first point to the right of the user to a second point to the left of the user. Unlike the ball and socket connector which permits the weight 130 to move to any position in a curved plane, here the actuator 220 can move the weight 130 to any point along the arc. Thus, the accelerations simulator 210 may be limited to simulated only forward and backward accelerations or only left and right accelerations depending on the orientation of the arc. For some applications of the headset 120, this limited range of motion of the weight 130 may be sufficient.

In one embodiment, the headset 120 may include two actuators for moving two pendulum and weight pairs. For example, one actuator 220 may move a pendulum forwards and backwards while the other actuator 220 moves a pendulum side to side. The acceleration simulator 210 may synchronize the movements of the pendulums to simulate accelerations in the same number of directions as a pendulum coupled to a ball and socket connector. For example, moving one weight to the front of the user and the other weight to the right of the user can simulate acceleration to the back and left of the user. Using two sets of pendulums may reduce cost and/or power relative to using a single pendulum coupled to a ball and socket connector.

The mass of the weight 130 may vary depending on the application. For example, to simulate smaller accelerations, a smaller weight can be used, but simulating larger accelerations may require larger weights. In one embodiment, the pendulum 125 is configured so that the user can switch out the weights 130. When the user is playing a game or watching a movie with small accelerations, the user may attach a smaller weight 130 to the pendulum since reducing the weight 130 may make the headset 120 more comfortable, mobile, or save battery power. However, if the user wants to watch a movie with larger accelerations (e.g., a movie with a car chase), the user may place a larger weight 130 on the pendulum. Moreover, the location of the weight 130 on the pendulum 125 may be adjustable such that the user or a controller on the headset 120 can slide the weight 130 to different locations on the pendulum 125. Similarly, the length of the pendulum 125 can also be variable and configurable by the user. However, if the user switches the pendulum 125, the weight 130, or the location of the weight 130 on the pendulum 125, the user may inform the acceleration simulator 210 so it can adjust its algorithm accordingly. For example, if a larger weight 130 is added, the actuator 220 may need to move the weight 130 smaller distances in order to achieve the same accelerations when a smaller weight 130 is on the pendulum 125.

In one embodiment, the user can configure the headset 120 to react only to a certain range or accelerations or frequency of accelerations. For example, the user may instruct the headset 120 to only simulate accelerations that are greater than 2 m/s^2 but less than 10 m/s^2 or, when switching between accelerations, to cap the change in acceleration at a maximum rate. Doing so may filter out large and sudden changes in acceleration to provide a smoother experience for the user.

In one embodiment, instead of moving the weight 130 to different locations, the force system 215 uses a plurality of force generation devices such as gyroscopes disposed at different places on the headset 120 (e.g., front, back, sides, etc.). Instead of moving weight to different locations, in this embodiment, actuators 220 in the force generation device control the amount of force outputted by the force generation devices. For example, by increasing the spin of a weight in a gyroscope disposed at the back of the headset 120, the gyroscope can cause a downward force similar to the downward force gravity causes on the pendulum 125 and weight 130 shown in FIG. 1. This downward force can pull the head of the user up to simulate forward acceleration. Moreover, the forces applied by a plurality of gyroscopes could be synchronized to generate forces in different directions which combine to result in a simulated acceleration in a particular direction. In this manner, the force system 215 may need only a few force-generation devices spread out over the headset 120 in order to simulate accelerations in the same number of directions that can be provided using the pendulum 125 and weight 130 mounted to a ball and socket connector. Other embodiments for implementing the force system 215 are discussed in FIGS. 8 and 9.

The headset 120 also includes accelerometers 222 which provide data to the acceleration simulator 210 for determining a current orientation of the headset 120 relative to the surface of the earth. In one embodiment, the acceleration simulator 210 uses the orientation of the headset 120 as a factor for determining a location of the weight 130 in order to simulate acceleration. For example, simulating forward acceleration may require the acceleration simulator 210 to move the weight 130 to a different position relative to the headset 120 when the user is facing straight ahead than when the head of the user is tilted down. Moreover, the headset 120 may use other orientation detectors in addition to the accelerometers 222 to determine the orientation of the headset 120 such as gyroscopes.

The headset 120 may include an integrated display 225 which is shown as being optional by the ghosted lines. In FIG. 1, the user views a media presentation on the external display 105, but in another embodiment, the headset 120 may be a virtual reality headset which uses the integrated display 225 to display a virtual scene to the user wearing the headset 120. The display 225 may be controlled by the computing system 110 (e.g., an external gaming console) using the communication link 231 or by an internal virtual reality (VR) controller in the headset 120. In one embodiment, the headset 120 may be a self-contained VR headset where an internal VR controller controls the output of the display 225 as well as provides accelerations to the acceleration simulator 210.

The computing system 110 includes a processor 230 and a memory 235. The processor 230 represents any number of processing elements which each can have one or more processing cores. The memory 235 can include volatile and nonvolatile memory elements and can include network or cloud storage that is external to the computing system 110.

The memory 235 includes a media application 240 which may include a video game, a VR system, a media player for outputting a movie or television program, and the like. The media application 240 includes an acceleration calculator 245 a display output 250, and a user input module 255. The acceleration calculator 245 determines simulated accelerations that correspond to a virtual environment being displayed to the user. In one embodiment, the acceleration calculator 245 determines a magnitude and a direction of the simulated acceleration. For example, if the media application 240 is a racing simulator, the acceleration calculator 245 may calculate accelerations assuming that the user is driving the racing vehicle. Put differently, the acceleration calculator 245 determines the magnitude and direction of accelerations the user would feel if she were actually driving the vehicle. The acceleration calculator 245 transmits the magnitude and direction of the acceleration (or a scaled version of thereof) to the acceleration simulator 210 which then simulates that acceleration using the force system 215 as described above.

The display output 250 generates images or frames which are then outputted on an external display viewed by the user or the internal display 225. The display output 250 is synchronized to the acceleration calculator 245 so that the acceleration determined by the acceleration calculator 245 match the motion in the display screen. For example, if the media application is outputting a video from the perspective of a fighter pilot in combat, the acceleration calculator 245 periodically calculates the current acceleration on the pilot caused by the plane and sends these accelerations to the acceleration simulator 210.

The user input module 255 accepts inputs from user input devices such as steering wheels, joysticks, pedals, buttons, mice, and the like. In one embodiment, the user input module 255 is used if the media application 240 is a game which requires user input, but may not be needed if the application 240 is a movie or a theme park ride. The display output 250 may use the signals received by the user input module 255 to determine the outputted display frames. For example, if the user casts a spell that causes an explosion, the display output 250 may output display frame showing the virtual avatar of the user getting knocked backwards. Near the same time, the acceleration calculator 245 determines the magnitude and direction of the acceleration felt by the user avatar and outputs that acceleration to the acceleration simulator 210 to be simulated on the user. For example, the actuators 220 may swing the pendulum 125 forward such that the weight 130 causes the head of the user to point downward which is a similar motion as if she were actually knocked backwards.

Figure 3:
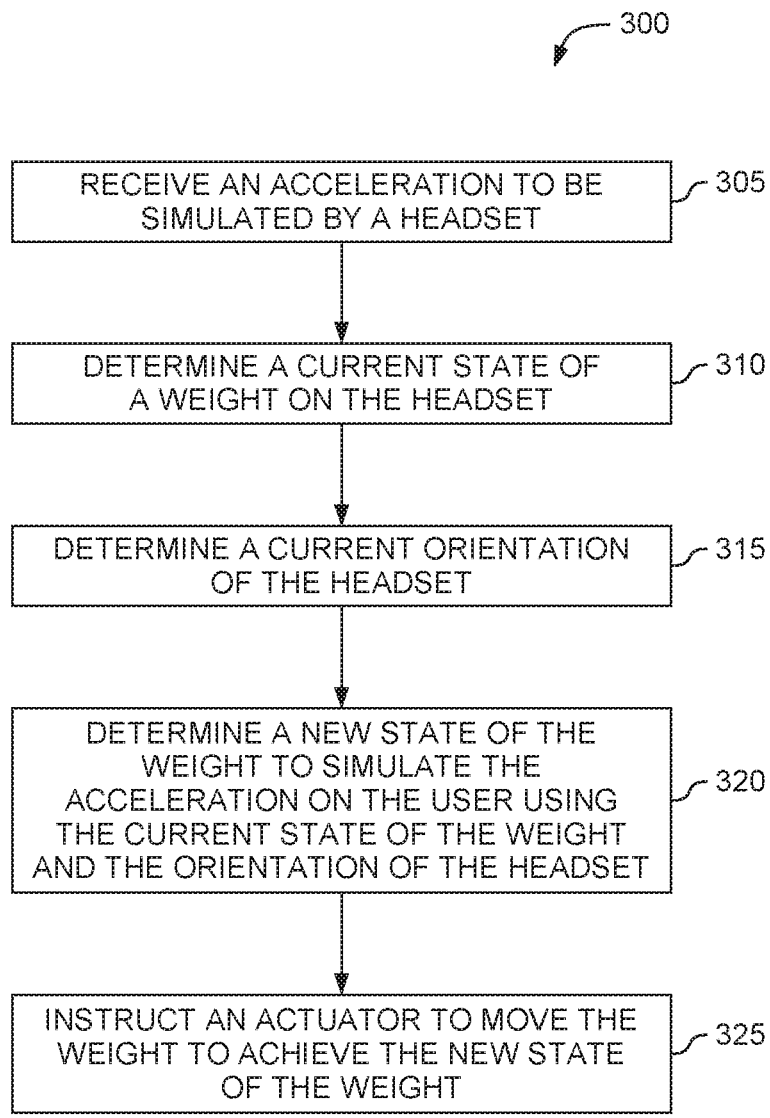
FIG. 3 is a flowchart for simulating accelerations on a user using a headset, according to one embodiment described herein.

FIG. 3 is a flowchart of a method 300 for simulating accelerations on a user using a headset, according to one embodiment described herein. At block 305, the acceleration simulator receives an acceleration to be simulated by a headset. In one embodiment, the received acceleration corresponds to a virtual acceleration on a virtual object in a displayed media presentation. For example, the received acceleration may correspond to an acceleration generated by a virtual car (e.g., a virtual object) in a racing simulator. A user avatar may (or may not be displayed) in the media presentation. For example, if the media presentation is from the first person view, then the user avatar may not be displayed to the user while the avatar is present if the media presentation is from a third person view. In either case, the received acceleration may correspond to a virtual acceleration caused by a virtual object in the displayed media presentation (e.g., an accelerating car or spaceship, recoil from a ballistic discharge, an explosion, etc.) that would have been felt by the user if the user were physically present in the media presentation.

In one embodiment, the received acceleration is defined by both a magnitude and a direction—e.g., a forward acceleration at 5 m/s^2. In another embodiment, the acceleration may just be a magnitude. For example, the headset may only simulate accelerations along a single axis, and thus, cannot vary the direction. Although the magnitude can be a precise number (e.g., 5 m/s^2), in another embodiment, the magnitude may be assigned a strength along a scale where, for example, a one is the smallest acceleration and a ten is the largest acceleration the headset can simulate.

FIGS. 4A and 4B illustrate respective simulated accelerations, according to one embodiment described herein. Specifically, FIGS. 4A and 4B illustrate top down views of the headset 120. In these examples, the user is facing in the direction of the user view 405. In FIG. 4A, the headset 120 simulates acceleration 410A that is to the back-left relative to the user view 405. This acceleration 410A may correspond to, for example, a virtual racing vehicle slowing down while going around a curve in the road. The length of the arrow illustrates the magnitude of the simulated acceleration 410A.

In FIG. 4B, the headset 120 simulates acceleration 410B that is to front-left relative to the user view 405. This acceleration 410B may correspond to the virtual racing vehicle accelerating around a curve.

In FIGS. 4A and 4B, it is assumed that the headset 120 can simulate accelerations in multiple different directions and axes rather than along only one axis. If, for example, a pendulum was mounted on an actuator that could only swing along a single axis, then the simulated accelerations 410 would lie only along that axis. However, in one embodiment, the headset 120 can simulate accelerations 410 in 360 degrees in a plane that is parallel with the user view 405 and the ground. For example, for the simulated acceleration 410A, the magnitude may be 6 m/s^2 and a direction of −160 degrees relative to the user view 405, while the simulated acceleration 410B has a magnitude of 4 m/s^2 and a direction of −15 degrees relative to the user view 405. In one embodiment, the acceleration calculator determines the accelerations 410 relative to a center position of the headset 120 so that the accelerations seen by the user in the display match the accelerations simulated by the headset 120.

Returning to method 300, at block 310, the acceleration simulator determines a current state of the weight on the headset. As used herein, the "weight" can include a weight mounted on a pendulum or tracks that changes position relative to the headset, as well as a weight in a gyroscope that spins to generate a force but whose location relative to the headset does not change. The state of a moveable weight may be the relative location of the weight to the headset—e.g., if the pendulum and weight are disposed at the front of the headset or disposed over the center point of the headset. The state of a weight in a gyroscope may be the speed the weight is spinning or the strength and direction of the force currently being applied by the gyroscope.

At block 315, the acceleration simulator determines a current orientation of the headset. In one embodiment, the acceleration simulator determines the orientation using location sensors on the headset such as accelerometers and gyroscopes. As mentioned above, the new state of the weight may be affected by the current orientation of the headset, e.g., whether the user has tilted her head forward or towards the side. The acceleration simulator may move the weight to a different position (or cause the weight in the gyroscope to apply a different force) depending on the current orientation of the headset.

FIGS. 5A and 5B illustrate different states of weight mounted on a headset at different orientations, according to one embodiment described herein. In FIG. 5A, the weight 130 is in a default state 505 and the headset is at a default orientation. In this example, the default state 505 of the weight 130 is when the pendulum and weight 130 is in the center of the headset 120. In another example, the default state 505 may be when the weight is disposed over the neck of the user. At this position, so long as the user does not tilt her head, the weight 130 does not cause a rotational force on the head or neck of the user, and thus, does not simulate acceleration.

In FIG. 5A, the orientation of the headset 120 is at a default position where the user is facing a direction that is parallel to the ground without tilting her head. Although the embodiments herein describe moving the weight 130 to simulate accelerations, the acceleration simulator may also move the weight 130 in order to prevent the headset 120 from simulating accelerations. For example, the media application may currently request that the acceleration simulator does not simulate any acceleration, or stated differently, the media application may instruct the acceleration simulator to control the weight 130 such that the headset 120 does not simulate accelerations. If the user keeps the headset 120 at the default orientation shown in FIG. 5A, then the acceleration simulator can keep the weight 130 stationary to prevent the headset 120 from simulating acceleration. However, if the user tilts her head to the side of lifts her head up, because the weight 130 is mounted on a pendulum, the location of the weight over the user also moves with can cause a rotational force on the head of the user and simulate an unintended acceleration. As such, if the media acceleration is not currently requesting that the headset 120 simulate acceleration, the acceleration simulator may nonetheless move the weight 130 as the user changes the orientation of the headset 120. In one embodiment, as the orientation of the headset 120 changes, the acceleration simulator may keep the weight 130 centered over the neck of the user with may mitigate or prevent the user from feeling any simulated accelerations. In this manner, the acceleration simulator can actively control the weight 130 so that the weight 130 does not simulate accelerations on the user as the user changes the orientation of her head.

In FIG. 5B, it is assumed the acceleration simulator has previously moved the weight 130 to simulate acceleration (a backwards acceleration in this example). In this example, the weight 130 has moved from state 505 to state 510 to generate a simulated acceleration 515. As shown, moving from the weight 130 from state 505 to state 510 caused the head of the user to tilt downwards. However, in another embodiment, the user can use her neck muscles to apply a force that counters the force applied by the weight 130 when in state 510 such that the orientation of the headset 120 in FIG. 5B does not change relative to the orientation of the headset 120 in FIG. 5A. Regardless of whether the user permits the weight 130 to change the orientation of the headset 120, the user still feels the simulated acceleration 515 resulting from the downward force of the weight 130.

When receiving a new acceleration to simulate, the acceleration simulator may move the weight 130 to a different state (e.g., location) depending on the current orientation of the headset 120. That is, the acceleration simulator may move the weight 130 shown in FIG. 5A to a different location relative to the headset 120 than the weight 130 shown in FIG. 5B when attempting to simulate the same acceleration. As described in more detail below, the acceleration simulator may use greater or smaller movements of the weight 130 to simulate a different acceleration when the weight 130 is at state 510 than when in state 505.

Moreover, the orientation of the headset 120 can also affect the new state of the weight 130. Put differently, if the weight 130 is at state 510, the acceleration simulator may move the weight 130 to a different location over the headset 120 depending on the orientation of the headset 120. For example, when the headset 120 is oriented as shown in FIG. 5B, the new state may be a different location than when the headset 120 is orientated as shown in FIG. 5A. Stated differently, even when the location of the weight 130 relative to the headset 120 is the same, the new state of the weight can vary depending on the orientation of the headset 120.

Returning to method 300, at block 320 the acceleration simulator determines a new state of the weight to simulate the acceleration on the user using the current state of the weight and the orientation of the headset. In one embodiment, the acceleration simulator uses a mathematical equation or a chart to determine the new state of the weight depending on the received acceleration, the current state of the weight, and the current orientation of the headset. For example, when receiving a new acceleration, the acceleration simulator can index into the chart and identify an entry that maps the current state and headset orientation to a new state of the weight which results in the desired simulated acceleration on the user. In this embodiment, the chart can be stored in the acceleration simulator during manufacturing. However, in other embodiments, the acceleration simulator uses a weighted equation or equations to determine the new state of the weight in real time.

If the weight 130 is mounted in the pendulum, the new state can include actuator settings for moving the pendulum to a new position. If the weight 130 is attached to a pulley system, the new state can include a location on the headset 120. If the weight 130 (or weights) is in a gyroscope, the new state can include a setting of the gyroscope for outputting the desired force that results in the simulated acceleration.

FIGS. 6A and 6B illustrate mapping a current state of the weight to different simulated accelerations, according to one embodiment described herein. Specifically, FIG. 6A illustrates identifying different states that would result in desired accelerations (i.e., $-20$ m/s$^2$, $-10$ m/s$^2$, $10$ m/s$^2$, and $20$ m/s$^2$) when the headset 120 and weight 130 are at the same orientation and state as shown in FIG. 5A, while FIG. 6A illustrates different states that would result in the simulated accelerations when the headset 120 and weight 130 are at the same orientation and state as shown in FIG. 5B.

In FIG. 6A, the headset 120 and the weight 130 are in a default state and orientation. To simulate a $-20$ m/s$^2$ acceleration (e.g., a backwards acceleration relative to the direction the user is facing), the acceleration simulator moves the weight 130 to a state 605A. To simulate $-10$ m/s$^2$ acceleration, the acceleration simulator moves the weight 130 to a state 605B. A 10 m/s$^2$ acceleration and a 20 m/s$^2$ acceleration (i.e., forward accelerations relative to the direction the user is facing) are achieved by moving the weight 130 to states 605C and 605D, respectively. Thus, by identifying the current state of the weight 130 and the orientation of the headset 120, the acceleration simulator can identify new states of the weight 130 that result in a desired acceleration.

In FIG. 6B, the weight 130 is a state that currently simulates a −10 m/s^2 acceleration on the head of the user. Put differently, the acceleration simulator has previously moved the weight to a state to simulate a −10 m/s^2 acceleration. Based on the current state of the weight 130 and the orientation of the headset 120, the acceleration simulator determines that moving the weight 130 to state 605 would simulate a −20 m/s^2 (i.e., increase the acceleration felt by the user). In contrast, moving the weight 130 to state 605F would stop the user from feeling any simulation from the weight 130. As shown in this example, the state 605F is different from the default state shown in FIG. 6A. That is, to simulate the same acceleration (in this case, no acceleration), the state can vary depending on the orientation of the headset 120. In this case, because the headset 120 is tilted forward, the state 605F is further to the back of the headset 120 than the default state shown in FIG. 6A. For example, at state 605F, the weight 130 may be positioned over a location of the neck of the user, and thus, not cause any rotational force on the head of the user.

To simulate a 10 m/s^2 acceleration, the acceleration simulator can move the weight to a state 605G, while a state 605H would simulate a 20 m/s^2 acceleration. Thus, as can be seen by comparing FIG. 6A and FIG. 6B, the states for providing the various accelerations can change depending on the current state (e.g., the current location) of the weight 130 as well as the current orientation of the headset 120.

In one embodiment, the acceleration simulator constantly monitors the state of the weight 130 and the orientation of the headset 120 to identify the various accelerations that can be achieved. Thus, once a new acceleration is received, the acceleration simulator can move the weight 130 to the new state with minimal delay so that the delay between what the user sees in the display and the forces felt by the user via the headset 120 is minimized. In one embodiment, the acceleration calculator already knows the future accelerations that are to be simulated on the user, e.g., when the media presentation is a movie or a theme park ride. In that scenario, the acceleration calculator may send the desired accelerations to the acceleration simulator early so that the simulator can calculate the states beforehand thereby removing any kind of processing delay in the acceleration simulator.

Returning to method 300, at block 325 the acceleration simulator instructs an actuator to move the weight to achieve the new state of the weight, e.g., as shown in FIGS. 6A and 6B. Once the new state is achieved, the weight causes a force or forces that simulate the received acceleration on the head of the user. In one embodiment, if mounted to a pendulum or a pulley system, the actuator moves the weight to a different location relative to the headset at block 325. However, if the weight and actuator are in a gyroscope, the actuator may change the spin or orientation of the weight in the gyroscope without changing the location of the weight on the headset.

FIG. 7 illustrates a headset 700 for compensating for a counter force when moving a weight mounted on the headset, according to one embodiment described herein. In one embodiment, the headset 700 may want to move the weight 130 as fast as possible between states so that the simulated accelerations felt by the user match quickly changing virtual accelerations on the user's avatar in the displayed media presentation. However, moving the pendulum 125 can cause a counter force 705 which may affect the simulated acceleration felt by the user.

In FIG. 7, the pendulum 125 moves the weight 130 from a state 715A simulating a backward acceleration to a state 715B simulating a forward acceleration. While moving the weight 130 between these states 715, the weight 130 generates the counter force 705. In this example, the counter force 705 generates a force that counters the desired simulated acceleration 720. That is, by moving the weight 130 to state 715B, the headset 700 attempts to generate the simulated acceleration 720 on the user. However, the counter force 705 is in the opposite direction of the rotational force the weight 130 generates on the neck of the user when at state 715B. Thus, the counter force 705 may reduce the strength of the simulated acceleration 720.

To compensate for the counter force 705, the headset 700 includes a compensation force module 710. In one embodiment, the force module 710 is a variable force generating device (e.g., a gyroscope) that can output a force that mitigates or eliminates the effect of the counter force 705. For example, the acceleration simulator may instruct the compensation force module 710 to output a force while the weight 130 moves from state 715A and 715B. Once the weight 130 arrives at state 715B, the acceleration simulator can instruct the compensation force module 710 to stop outputting a force. That is, the acceleration simulator can cause the compensation force module 710 to only output a force (or output an increased force) when the counter force 705 is generated. In this manner, the compensation force module 710 can output a force which aids the headset 700 to output a more smooth transition between simulated accelerations—e.g., the acceleration simulated at state 715A versus the acceleration simulated at state 715B.

In another embodiment, instead of using the compensation force module 710, the acceleration simulator may decrease the speed at which the pendulum 125 and weight 130 move between the states 715A and 715B. Although this may result in the user feeling the simulated acceleration 720 with a slightly increased delay, the counter force 705 is reduced which means the transition between accelerations is smoother without have to add the compensation force module 710 to the headset 700.

Figure 8:
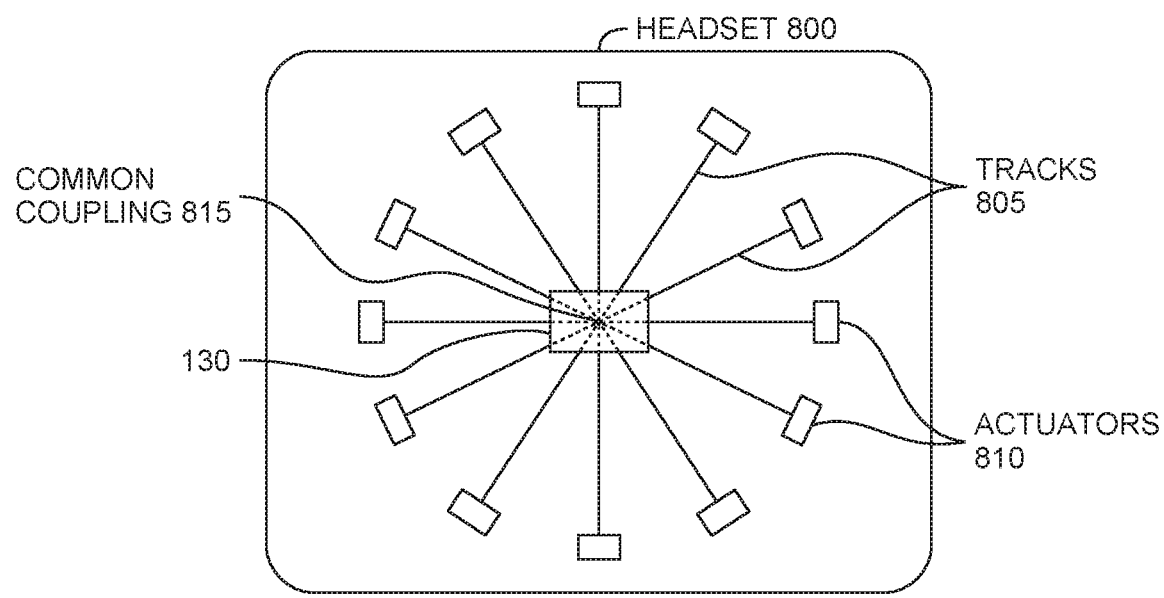
FIG. 8 illustrates a headset with a track mounted weight, according to one embodiment described herein.

FIG. 8 illustrates a headset 800 with a track mounted weight, according to one embodiment described herein. Specifically, FIG. 8 illustrates a top view of the headset 800. Instead of using a pendulum or gyroscopes to simulate accelerations, the headset 800 includes tracks 805 on which the weight 130 is mounted. In this example, the tracks 805 all meet at a point of common coupling 815. Ghosted lines are used to represent the tracks 805 extending below the weight 130 to meet at the point of common coupling 815. The tracks 805 extend out from the point of common coupling 815 which, in this example, is disposed in the middle of the headset 800. From the point of common coupling 815, the weight 130 can move down any one of the tracks 805. That is, the common coupling 815 provides a junction where the weight 130 can be moved to a different track, and thus, moved to a different location on the headset 800.

Actuators 810 are disposed at the ends of the tracks 805. Although not shown, the actuators 810 may be coupled to strings or chains that extend along the track to the point of common coupling 815. When the weight 130 is at the point of common coupling 815, the strings or chains of one of the actuators 810 attach to the weight 130 to move the weight 130 along the corresponding track 805 towards the actuator 810. As described above, the actuators 810 and the tracks 805 can move the weight 130 to different locations on the top of the headset 800 to simulate different accelerations. In this example, the headset 800 can simulate acceleration in any direction that includes one of the tracks 805. In other embodiments, the headset 800 may include fewer or greater than the number of tracks shown.

The magnitude of the acceleration can be controlled depending on how far down the track 805 the actuator 810 moves the weight 130. The headset 800 may simulate larger forces by moving the weight 130 farther away from the point of common coupling 8015 and towards the actuator 810. To simulate acceleration in a different direction, the actuator 810 returns the weight 130 to the point of common coupling 815 where a different actuator 810 can attach its string or chain to the weight 130 to move the weight 130 down a different track 805 thereby simulating an acceleration in a different direction.

Figure 9:
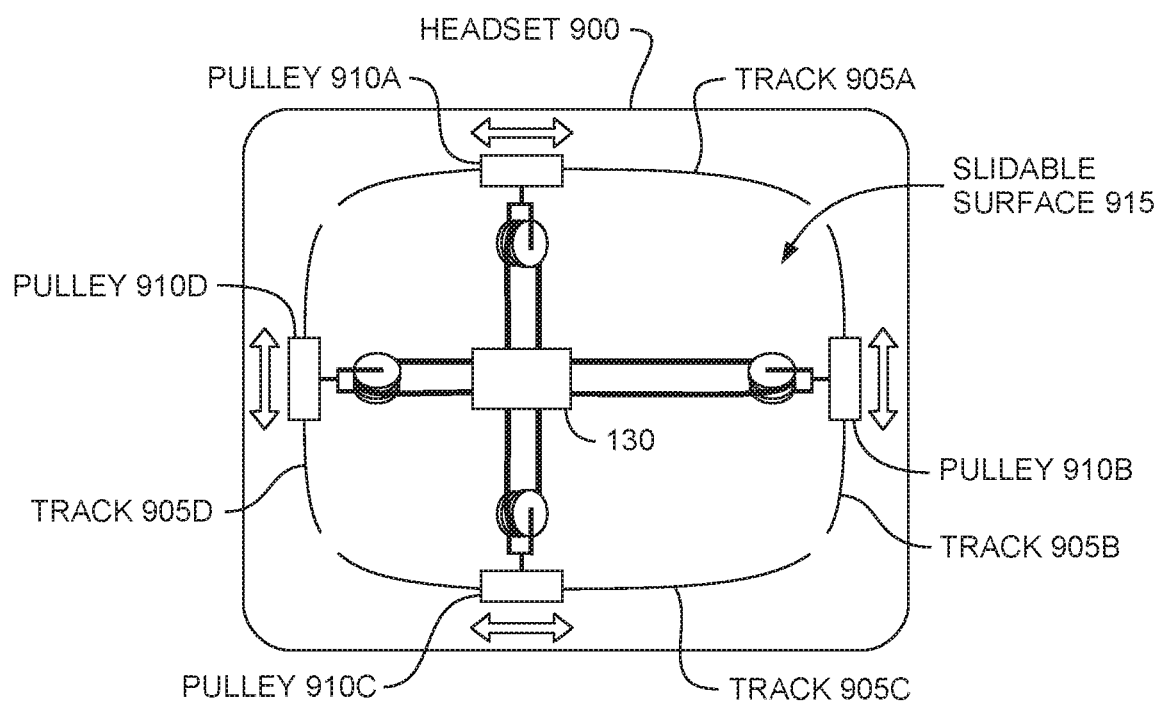
FIG. 9 illustrates a headset with a pulley system to move a weight, according to one embodiment described herein.

FIG. 9 illustrates a headset 900 with a pulley system to move the weight 130, according to one embodiment described herein. Specifically, FIG. 9 illustrates a top view of the headset 900. In FIG. 9, the headset 900 includes pulleys 910 which are mounted to respective tracks 905. As shown, the pulley 910A is moveably mounted on the track 905A, the pulley 9108 is moveably mounted on the track 905B, and so forth. Each of the pulleys 910 is coupled to the weight 130 in order to move the weight 130 along a slidable surface 915. Unlike in FIG. 8 where the weight 130 moves along tracks, here, the weight 130 may slide on the surface 915 in response to the pulleys 910.

In one embodiment, the pulleys 910 operate in pairs to move the weight 130. For example, the pulleys 910A and 910C may operate in tandem to move the weight in the Y direction (i.e., the vertical direction in FIG. 9) while the pulleys 910B and 910D operate in tandem to move the weight 130 in the X direction (i.e., the horizontal direction in FIG. 9). Moreover, because the pulleys 910 can move along their tracks 905, when one pair of pulleys 910 moves the weight, the other pair of pulleys moves along their tracks 905 at a similar rate. For example, if the pulleys 910A and 910C move the weight 130 upwards on the slidable surface 915, the pair of pulleys 9108 and 910D may move up at a same rate and distance on their respective tracks 905B and 905D.

In one embodiment, the pulleys 910 move the weight using a chain or string at the same time the pulleys 910 are moving along the tracks 905. For example, to slide the weight to an upper right hand corner of the slidable surface 915, the pulleys 910A and 910C move the weight 130 in the upwards direction while moving to the right on their tracks 905A and 905C at the same rate the pulleys 9108 and 910D work in tandem to move the weight 130 to the right. At the same time, the pulleys 910B and 910D slide upwards on their tracks 905B and 905D to match the movement of the weight 130 in the upwards direction caused by the pulleys 910A and 910C. In this example, the weight 130 would move at a diagonal from its current location shown in FIG. 9 to the upper right corner of the surface 915.

Like above, the headset 900 may provide control signals to the pulleys 910 in order to move the weight 130 to different locations on the slidable surface 915 in order to simulate accelerations in different directions. For example, the further the pulleys 910 move the weight 130 from the center of the headset 900, the greater the magnitude of the simulated acceleration.

While FIG. 9 illustrates using two pairs of pulleys 910, if only forward and backwards accelerations are desired, the headset 900 can include only the pulleys 910A and 910C which are fixable mounted on the headset 900 to move the weight 130 upwards and downwards from the center point of the headset 900.

In one embodiment, in the headsets 800 and 900 shown in FIGS. 8 and 9, the weight 130 could be hidden from view if mounted on an internal surface in the headset 120. That is, the surfaces shown in FIGS. 8 and 9 could be covered by an external surface on the headset 800 and 900 such that the weight 130, tracks 805, actuators 810, pulleys 910, and tracks 905 are hidden from view.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A headset, comprising:
a head-mountable frame;
a pendulum comprising a rod and a weight coupled to a first end of the rod;
a ball and socket connector connecting the pendulum to the head-mountable frame;
an actuator connected to the ball and socket connector; and
an acceleration simulator configured to:
receive an acceleration to be simulated by the headset, wherein the acceleration corresponds to a virtual acceleration caused by a virtual object in a displayed media presentation;
determine a current state of the weight on the headset;
determine a current orientation of the headset in space;
determine a new state of the weight to simulate the acceleration on a user wearing the headset based on the current state and the current orientation; and
instruct the actuator to move the ball and socket connector to achieve the new state.

2. The headset of claim 1, wherein instructing the actuator to move the ball and socket connector to achieve the new state comprises:
moving the pendulum such that the weight is disposed at a different location relative to the headset than when the weight is in the current state.

3. The headset of claim 1, wherein a gravitational force on the weight when at the new state causes a resulting force on the user which simulates the received acceleration.

4. The headset of claim 1, wherein the weight is slidably disposed on a surface of the headset, wherein the headset comprises:
a pulley system comprising the actuator, wherein the pulley system is configured to slide the weight on the surface to achieve the new state.

5. The headset of claim 1, further comprising:
a force generating device comprising the actuator, wherein the force generating device is configured to achieve the new state by at least one of spinning the weight and changing an orientation of the weight to generate a force that simulates the received acceleration.

6. The headset of claim 1, wherein the new state results in the weight applying a first force that causes a rotational force on a head of the user which corresponds to a second force the user would feel if the user were subjected to the virtual acceleration in the displayed media presentation.

7. The headset of claim 1, wherein the current state of the weight is adjustable by the user wearing the headset and determining the current state of the weight on the headset comprises:
 determining the length of the rod; and
 determining the mass of the weight.

8. The headset of claim 1, the headset further comprising:
 a compensation force module comprising a variable force generating device configured to:
  receive a counter force measurement, the counter force being generated by the motion of the weight and exerts a force in the opposite direction of the motion of the weight;
  determine a compensating force that mitigates the counter force; and
  instruct the variable force generating device to output the compensating force.

9. The headset of claim 1, wherein the acceleration is in the opposite direction to the motion of the weight.

10. A non-transitory computer readable storage medium comprising:
 computer-readable program code for simulating an acceleration using a headset, wherein, when executed by a computing processor, the computer-readable program code performs an operation comprising:
 receiving the acceleration to be simulated by the headset, wherein the acceleration corresponds to a virtual acceleration caused by a virtual object in a displayed media presentation;
 determining a current state of a weight on the headset; determining a current orientation of the headset in space; determining a new state of the weight to simulate the acceleration on a user wearing the headset based on the current state and the current orientation; and
 instructing an actuator in the headset to move a ball and socket connector to achieve the new state;
 wherein instructing the actuator comprises moving a pendulum comprising a rod, the weight, and the ball and socket connector, wherein the weight is coupled to a first end of the rod and the actuator is coupled to a second end of the rod via the ball and socket connector.

11. The computer readable storage medium of claim 10, wherein moving the ball and socket connector comprises:
 moving the pendulum such that the weight is disposed at a different location relative to the headset than when the weight is in the current state.

12. The computer readable storage medium of claim 10, wherein a gravitational force on the weight when at the new state causes a resulting force on the user which simulates the received acceleration.

13. The computer readable storage medium of claim 10, wherein the weight is slidably disposed on a surface of the headset, wherein instructing the actuator to move the weight to achieve the new state comprises:
 actuating a pulley system comprising the actuator, wherein the pulley system is configured to slide the weight on the surface to achieve the new state.

14. The computer readable storage medium of claim 10, wherein the new state results in the weight applying a first force that causes a rotational force on a head of the user which corresponds to a second force the user would feel if the user were subjected to the virtual acceleration in the displayed media presentation.

15. A system, comprising:
 a video game system configured to:
  output a media presentation to a display, and
  generate an acceleration corresponding to a virtual acceleration caused by a virtual object in the media presentation; and
 a headset configured to:
  receive the acceleration from the video game system,
  determine a new state of a weight on the headset to simulate the acceleration on a user wearing the headset, wherein the weight is slidably disposed on a surface of the headset, and
  instruct an actuator disposed on the headset to move the weight to achieve the new state, wherein the headset comprises a pulley system configured to slide the weight on the surface to achieve the new state.

16. The system of claim 15, wherein the headset further comprises:
 a pendulum comprising the weight, wherein the weight is coupled to a first end of the pendulum and the actuator is coupled to a second end of the pendulum.

17. The system of claim 16, wherein instructing the actuator to move the weight to achieve the new state comprises:
 moving the pendulum such that the weight is disposed at a different location relative to the headset than when the weight is in a current state.

18. The system of claim 15, wherein the headset further comprises:
 a force generating device configured to achieve the new state by at least one of spinning the weight and changing an orientation of the weight to generate a force that simulates the received acceleration.

19. The system of claim 15, wherein the new state results in the weight applying a first force that causes a rotational force on a head of the user which corresponds to a second force the user would feel if the user were subjected to the virtual acceleration in the media presentation.

* * * * *